United States Patent [19]
Balkwill et al.

[11] 4,158,420
[45] Jun. 19, 1979

[54] AIR AND MOISTURE BARRIER FOR ELECTRICAL OUTLET BOXES

[76] Inventors: G. Russell Balkwill, 2429 Howard Ave., Windsor, Ontario, Canada, N8X 3Y5; Jules P. Robinet, 2865 Virginia Park, Windsor, Ontario, Canada, N9E 2B8; John F. Tamasovics, 2530 Todd La., Windsor, Ontario, Canada, N9H 1K5

[21] Appl. No.: 908,223
[22] Filed: May 22, 1978
[51] Int. Cl.² .............................................. H02G 3/08
[52] U.S. Cl. ................... 220/3.3; 220/3.92; 220/3.94
[58] Field of Search ................ 220/3.92, 3.94, 3.2, 220/3.3, 3.4, 3.5, 3.6; 174/57; 52/220, 221

[56] References Cited
U.S. PATENT DOCUMENTS

| | | | |
|---|---|---|---|
| 3,126,160 | 3/1964 | Berger | 220/3.94 |
| 3,622,029 | 11/1971 | Ware | 220/3.94 |
| 3,690,501 | 9/1972 | Ware | 220/3.94 |
| 3,892,911 | 7/1975 | Codrino | 220/3.94 |

FOREIGN PATENT DOCUMENTS 2038820  2/1972  Fed. Rep. of Germany ............ 220/3.2

Primary Examiner—Joseph Man-Fu Moy
Attorney, Agent, or Firm—Charles Krassov

[57] ABSTRACT

This invention consists of a transparent non-inflammable plastic container the purpose of which is to enclose an electrical outlet box to prevent air and water or moisture from entering into or passing through such box. The container is in the form of a rectangular box for use with rectangular outlet boxes, and is round for use with round or octagonal outlet boxes. Each of the containers is provided with a flange around the open rim of it, and said flange extends outwardly and at a small angle to the wall of the container.

1 Claim, 3 Drawing Figures

AIR AND MOISTURE BARRIER FOR ELECTRICAL OUTLET BOXES

This invention consists of a container which is used to cover electrical outlet boxes, for the purposes of preventing cold air from entering, and heated air from escaping, from the interior of buildings in which such boxes are installed; and to prevent water or moisture from entering such boxes.

The present method of installing outlet boxes allows air which is activated by winds to enter the building from the outside and permits the escape of warm air from the building through these boxes. Furthermore, many building fires and electrocutions are caused by short circuits originating in these outlet boxes because moisture can enter into them quite easily.

It is therefore the primary object of this invention to provide a means for making electrical outlet boxes as air and moisture proof as possible without the necessity of redesigning such boxes nor radically changing the established method of installation.

This is accomplished by the invention by providing a cover for the outlet box, which is air and water proof for all practical purposes, and which can be installed concurrently with the installation of the outlet box.

Figure 1:
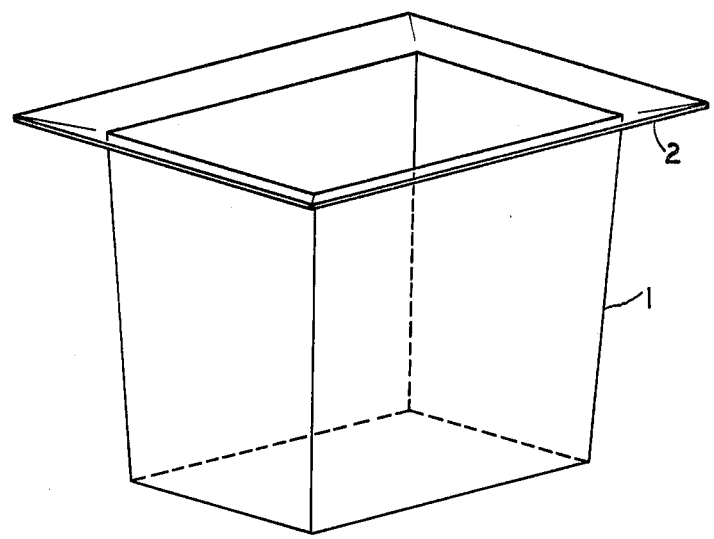
Figure 2:
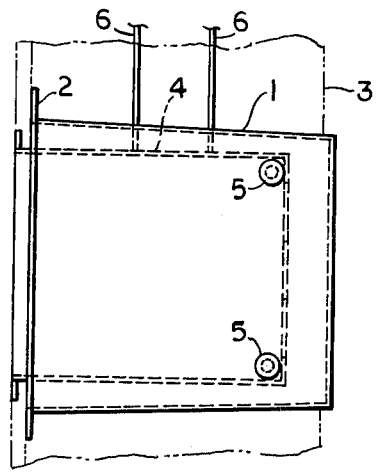
Figure 3:
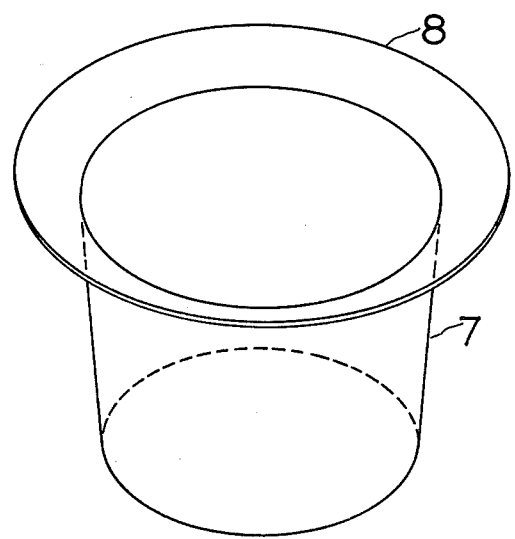

In describing the invention reference will be made to be attached drawings in which, FIG. 1, is an isometric view of the invention, FIG. 2, shows the method of installing the invention, and FIG. 3, shows a variation in the shape of the invention.

In the drawings the invention is shown consisting of a rectangular, transparent plastic container 1 having an open top, the rim of which is provided with a flange 2 which slants upwardly or away from the box 1 at a small angle.

The container 1 is made large enough to fit freely over a standard electrical outlet box 4, and this outlet box together with irs plastic cover 1 is nailed to a building stud 3, in the usual manner of installation, with nails 5,5. The insulated electrical wires 6,6, are led from the box 4 through punched holes in the container 1. These holes can be made small enough to provide a tight fit for the insulated wires 6, to prevent any air or moisture from entering into the container 1. If required, and as a further precaution, a sealing compound can be pasted around the said wires at their exit from the container 1.

In FIG. 3, is shown a variation 7 in which the container 1 is changed to a round shape in order to conform with electrical outlet boxes which are round or octagonal in shape.

The installation of the outlet box with its container is shown in FIG. 2. The box 4 is placed into the container 1 or 7, as the case may be, so that the open face of the outlet box 4 is flush with the face of the interior wall of a building; the flange 2 or 8 of the container 1 or 7, respectively, is pressed tightly against the said building wall; and both the outlet box and its container are nailed to a stud 3. By pressing the flanges of the said containers against the wall before nailing, the said flanges assume a position almost at rightangles to the container walls, and thereby form a tight seal which stops air or moisture to pass through the container and into the outlet box.

It is preferable to fabricate the containers 1 or 7 out of a transparent plastic material, and particularly of a plastic which is fireproof or fire retarding, so that the interior can be observed and so that any flash due to a short circuit occurring within the container will be prevented from igniting any adjacent structural wood.

Having described my invention, what I claim is:

1. In combination, a building wall or the like, a stud contiguous with a back surface of said wall the like, an electrical outlet box having an open face generally flush with the wall or the like, a container made of a transparent, flexible, non-flammable plastic material so that its contents are visible at all times, said container being of a size to fit freely over and enclose said electrical box and having an open side in which said outlet box is received, said container having a narrow flange around the perimeter of the open side and extending outwardly therefrom, said container totally enclosing said outlet box with said flange being in a stressed condition and urged against and tightly contacting the back surface of the wall or the like around said outlet box, and at least one nail having a shank extending through said container from the side opposite said stud and through said outlet box from the side opposite said stud, and into said stud to affix said container and said outlet box in a fixed position relative to said building wall or the like.

* * * * *